United States Patent Office 2,946,937
Patented July 26, 1960

2,946,937
CERAMIC MATERIAL AND METHOD OF PRODUCING THE SAME

John M. Herbert, Horton, England, assignor to The Plessey Company Limited, Ilford, England, a British company No Drawing. Filed May 7, 1956, Ser. No. 582,945

5 Claims. (Cl. 317—258)

This invention relates to ceramic materials and is concerned with the manufacture of a ceramic material of high permittivity suitable for use as a condenser dielectric.

It is an object of the invention to provide an improved ceramic dielectric material which facilitates the application of electrodes made of a base metal in the same operation with the sintering of the dielectric. Another object is to provide an improved ceramic dielectric material which when fired in a reducing atmosphere will yield a sintered dielectric ceramic body of high permittivity, suitable for use as a condenser dielectric. Other objects and features of the invention will appear as this specification proceeds.

In one form of the invention the material comprises barium titanate together with a substantial quantity of manganous oxide and is produced by firing suitable ingredients in hydrogen. Preferably the ingredients are in the proportions required to give $2BaTiO_3MnO$, $$4BaTiO_3MnO$$

or $6BaTiO_3MnO$ although it is doubtful if such mixed oxides exist. The material contains free manganous oxide and a compound closely resembling barium titanate and which is believed to be a solution of manganous oxide in barium titanate.

It is possible to substitute other elements for up to 50 mol percent of the barium and titanium. Substitutions of more than a few percent result in a material of reduced permittivity, but it may have a lower temperature coefficient of permittivity. Elements which may be substituted for barium are magnesium, beryllium, calcium, strontium, yttrium and lanthanum. For titanium there may be substituted zirconium, hafnium cerium, thorium, tin and tantalum.

Magnesium may be used in part instead of manganese, substitution of up to 75 mol percent being possible without appreciably affecting the dielectric properties.

Although the dielectric is slightly inferior in electrical properties when compared with ceramic compositions fired in air, it is quite suitable for smoothing condensers and the like and the invention makes possible and economical manufacture of condensers of large capacitance (say 8 mf.) with a high permittivity ceramic dielectric.

An advantage of the invention is that it is possible for base metal electrodes to be sintered simultaneously with the firing of the ceramic composition; any metal can be used which does not react with barium titanate or melt below 1150° C.

In order that the invention may be more fully and clearly understood various ways of putting the invention into effect will now be described.

Three possible compositions for the dielectric material, which will for convenience be referred to as A, B and C, are given below, the proportions being by weight:

|  | A | B | C |
|---|---|---|---|
| Barium carbonate | 118.4 | 130.0 | 130.0 |
| Titanium dioxide | 47.9 | 52.6 | 51.3 |
| Manganese carbonate | 34.5 | 19.0 | 37.9 |
| Zirconium dioxide |  |  | 2.03 |

The ingredients in the form of fine powders produced by precipitation, are thoroughly mixed and then fired in air at 1100° C. for two hours. The resulting mass is then ground to provide the raw material for capacitor dielectrics, the production of which will be described hereinafter.

It is convenient for the capacitor electrodes to be also produced from raw material in powder form and suitable electrode compositions D, E and F are given below, the proportions being by weight:

|  | D | E | F |
|---|---|---|---|
| Iron powder |  | 60 | 36 |
| Iron oxide | 40 | 40 | 24 |
| Dielectric composition A | 60 |  | 40 |

In the case of composition D, the powdered ingredients are well mixed, fired in air at 1000° C. for two hours and then ground; compositions E and F are simply mixtures of powders.

Further dielectric compositions in accordance with the invention are tabulated below where molecular percentages of the various ingredients are shown. It will be noted that examples of compositions in which part of the titanium is replaced by other elements are included.

| Composition | BaO | TiO$_2$ | MnO | ThO$_2$ | CeO$_2$ | ZrO$_2$ | SnO$_2$ | Ta$_2$O$_5$ |
|---|---|---|---|---|---|---|---|---|
| G | 46.3 | 46.3 | 7.35 |  |  |  |  |  |
| H | 40.0 | 38.0 | 20.0 | 2.0 |  |  |  |  |
| J | 40.0 | 39.5 | 20.0 |  | 0.5 |  |  |  |
| K | 40.0 | 35.9 | 20.0 |  |  | 4.06 |  |  |
| L | 40.0 | 39.0 | 20.0 |  |  |  | 1.01 |  |
| M | 40.0 | 39.0 | 20.0 |  |  |  |  | 1.0 |

It is possible to produce electrodes by including any of the following elements in the dielectric composition, so that conductive particles are dispersed throughout the dielectric: copper, silver, gold, lead, antimony, bismuth, molybdenum, tungsten, iron, cobalt, nickel, ruthenium, rhodium, palladium, osmium, iridium and platinum. If chromium or niobium are included in the composition then conductive oxides of these elements are formed.

The following elements are relatively inert and their oxides if present in the compositions merely result in a lowering of the dielectric constant: lithium, sodium, potassium, rubidium, caesium, boron, aluminium, silicon, and phosphorous.

The presence of zinc, cadmium, mercury, or arsenic in the composition has no effect in the dielectric properties since the oxides of these elements will be reduced and will then volatilise. Fluorine and sulphur form innocuous anions and also have no effect on the properties.

In the construction of capacitors, it is often advantageous to have the electrodes and dielectric in the form of films, and for this purpose the above compositions can be mixed with a binding lacquer. A suitable lacquer comprises cellulose acetobutyrate, diamyl tartarate, and ethylene dichloride in the proportions by weight of 9, 5 and 50 respectively. 100 parts of lacquer are thoroughly mixed with 180 parts of a powdered dielectric or electrode composition. The semi-fluid mass thus produced is spread in a uniform thin layer on a smooth surface, After drying, the resulting film is peeled from the surface and cut into pieces of the required size and shape.

One way in which the above compositions can be used to construct a capacitor, is to assemble alternate pieces of dielectric and electrode film made as described above, to form a stack of interleaved parts. The pieces of film are caused to adhere together by applying pressure (0.5 ton per sq. in.) at a temperature of 120° C. The electrode films can be joined together by painting the gaps between their projecting ends with a suspension of one of the electrode compositions.

If an electrode composition such as D which is free of metal is used in the above construction, the assembled stack can be fired at 500–1000° C. in air to remove all organic matter. Thereafter, it has to be fired in a reducing atmosphere such as hydrogen at 1150° C. for two hours in order to mature the ceramic dielectric and to reduce and sinter the electrodes.

If composition E or F is used the entire firing process can be conveniently carried out in a reducing atmosphere. The carbonaceous residue of the plastic binder can be eliminated by introducing a small amount of carbon dioxide or water into the furnace atmosphere at a temperature somewhat below that at which sintering takes place. For instance, when the furnace temperature reaches 1000° C. the hydrogen supply used as the reducing atmosphere is passed through a vessel containing water at 70° C. before it enters the furnace. The gas picks up sufficient water vapour in this way to oxidise any carbon but not enough to oxidise metallic iron. After an hour at 1000° C. the furnace is heated to the sintering temperature, 1150° C., the water is removed from the gas circuit and the sintering completed in dry hydrogen.

Another manner of constructing a capacitor is to take pieces of dielectric film, oxidise them free of organic matter and then fire in hydrogen. These pieces may then be coated with a suspension of iron and glass powders containing not more than 3 parts of powdered glass to one of iron; the glass is matched in coefficient of thermal expansion to the iron and the titanate composition. The coated pieces are interleaved and any end connections made with the iron-glass suspension. The assemblies are then fired in hydrogen to a sufficiently high temperature to sinter the glass.

The advantage of the method in this case lies in the cheapness of the iron and glass electrode material which may be applied thickly to the dielectric pieces so that, on sintering, it will fill the spaces which would otherwise be present due to the lack of perfect flatness of the dielectric layers.

The dielectric and electrode materials can also be extruded as ribbon and wound together in a similar manner to paper condensers, and then subsequently sintered.

The dielectric may be pressed as a compact from powder with or without a suitable binder and combined either with similar compacts of electrode material or with the electrode material combined in a plastic bound film.

The electrode may also be in the form of a metallic wire which is coated with the powdered dielectric material. The dielectric is sintered in hydrogen to form an adherent enamel. An outer electrode may either be applied subsequently or as a further coating prior to sintering.

The sintered capacitor assemblies require the attachment of leads and to be coated with an insulating medium to protect them from the atmosphere. In the case of electrode composition E wires may be hard or soft soldered to the sintered parts. In the case of D and F direct soldering is difficult though the exposed parts of the electrodes may be electroplated and then soldered. Leads can be attached with a paste of glass and iron powders which is heated so as to melt the glass; this operation can be combined with the application of a coating of glass to the whole assembly.

Dielectrics when prepared from compositions A, B and C by the above methods have the properties tabulated below:

| Temperature, °C. | A | | B | | C | |
|---|---|---|---|---|---|---|
| | Dielectric Constant | Power Factor, Percent | Dielectric Constant | Power Factor, Percent | Dielectric Constant | Power Factor, Percent |
| 20 | 3,300 | 2.7 | 4,200 | 3.0 | 3,200 | 0.75 |
| 30 | 3,360 | 2.2 | 4,300 | 3.0 | 3,090 | 0.75 |
| 40 | 3,620 | 2.2 | 4,800 | 2.7 | 2,840 | 0.75 |
| 50 | 4,050 | 2.1 | 4,970 | 2.7 | 2,520 | 0.75 |
| 60 | 4,500 | 1.8 | 4,680 | 2.8 | 2,210 | 0.80 |
| 70 | 4,380 | 1.8 | 4,000 | 3.1 | 1,920 | 0.90 |
| 80 | 3,600 | 1.8 | 3,340 | 3.3 | 1,650 | 1.00 |
| 90 | 3,000 | 1.8 | 2,800 | 3.4 | 1,410 | 1.00 |
| 100 | 2,440 | 1.9 | 2,400 | 3.6 | 1,260 | 1.02 |

Compositions G, H, J, K, L and M have the following properties:

| Temperature, °C. | G | | H | | J | | K | | L | | M | |
|---|---|---|---|---|---|---|---|---|---|---|---|---|
| | Dielectric Constant | Power Factor, Percent | Dielectric Constant | Power Factor, Percent | Dielectric Constant | Power Factor, Percent | Dielectric Constant | Power Factor, Percent | Dielectric Constant | Power Factor, Percent | Dielectric Constant | Power Factor, Percent |
| 20 | 3,000 | 1.5 | 500 | 3.5 | 4,200 | 10 | 2,400 | 1.2 | 1,470 | 1.7 | 4,500 | 6 |
| 40 | 4,400 | 1.5 | 470 | 4.0 | 3,700 | 7.4 | 2,200 | 1.0 | 1,330 | 1.8 | 5,700 | 11.5 |
| 60 | 4,500 | 1.7 | 455 | 4.5 | 2,800 | 5.8 | 1,800 | 1.2 | 1,150 | 2.3 | 4,400 | 10.5 |
| 80 | 3,500 | 2.0 | 430 | 5.0 | 2,000 | 4.8 | 1,500 | 1.4 | 1,000 | 2.8 | 3,500 | 7.5 |
| 100 | 2,500 | 2.5 | 410 | 6.2 | 1,500 | 4.4 | 1,200 | 1.8 | 860 | 4.0 | 2,500 | 9.0 |

What I claim is:

1. A method of producing a dielectric sintered body, which comprises shaping the body of a material which, at least after sintering consists essentially of barium titanate and a smaller molecular quantity of manganous oxide, the amount of manganous oxide being at least approximately 14 mol percent of the composition as a whole, and sintering said body in a reducing atmosphere to give a body which comprises barium titanate and manganous oxide in a proportion corresponding to a formula selected from the group consisting of $MnO.(BaTiO_3)_2$, $MnO.(BaTiO_3)_4$ and $MnO.(BaTiO_3)_6$ 2. A sintered body as claimed in claim 1, wherein a portion not exceeding three quarters of the molecular manganous oxide content is replaced by magnesium oxide.

3. A ceramic capacitor comprising an integral sintered body including at least one layer of ceramic dielectric material which material consists essentially of barium titanate and a smaller molecular quantity of manganous oxide, the latter constituting at least approximately 14 mol percent of the composition as a whole, said sintered body comprising barium titanate and manganous oxide in a proportion corresponding to a formula selected from the group consisting of $MnO.(BaTiO_3)_2$, $MnO.(BaTiO_3)_4$ and $MnO.(BaTiO_3)_6$ and also including electrodes of a base metal having a melting point not lower than 1150° C.

4. A ceramic capacitor as claimed in claim 3, wherein said integral sintered body includes a plurality of layers of such ceramic dielectric material and electrodes of such base metal separating said layers of dielectric material.

5. A ceramic capacitor as claimed in claim 3, wherein a portion of the manganous oxide is replaced by magnesium oxide, the molecular magnesium oxide content being not more than three times the molecular manganous oxide content.

References Cited in the file of this patent

UNITED STATES PATENTS

| | | |
|---|---|---|
| 2,137,135 | Fuwa et al. | Nov. 15, 1938 |
| 2,520,376 | Roup et al. | Aug. 29, 1950 |
| 2,529,719 | Wentworth | Nov. 14, 1950 |
| 2,534,653 | Austin et al. | Dec. 19, 1950 |
| 2,695,240 | Oshry | Nov. 23, 1954 |
| 2,736,080 | Walker et al. | Feb. 28, 1956 |
| 2,750,657 | Herbert et al. | June 19, 1956 |
| 2,801,181 | Das Gupta | July 30, 1957 |
| 2,815,291 | Rogatz | Dec. 3, 1957 |

FOREIGN PATENTS

| | | |
|---|---|---|
| 574,577 | Great Britain | Jan. 11, 1946 |
| 690,360 | Great Britain | Apr. 15, 1953 |
| 460,764 | Canada | Nov. 1, 1949 |